Sept. 1, 1964  R. O. STROMBERG  3,147,043
HYDRAULIC BRAKE ACTUATING MECHANISM FOR AUTOMOTIVE VEHICLES
Filed May 28, 1962  2 Sheets-Sheet 1
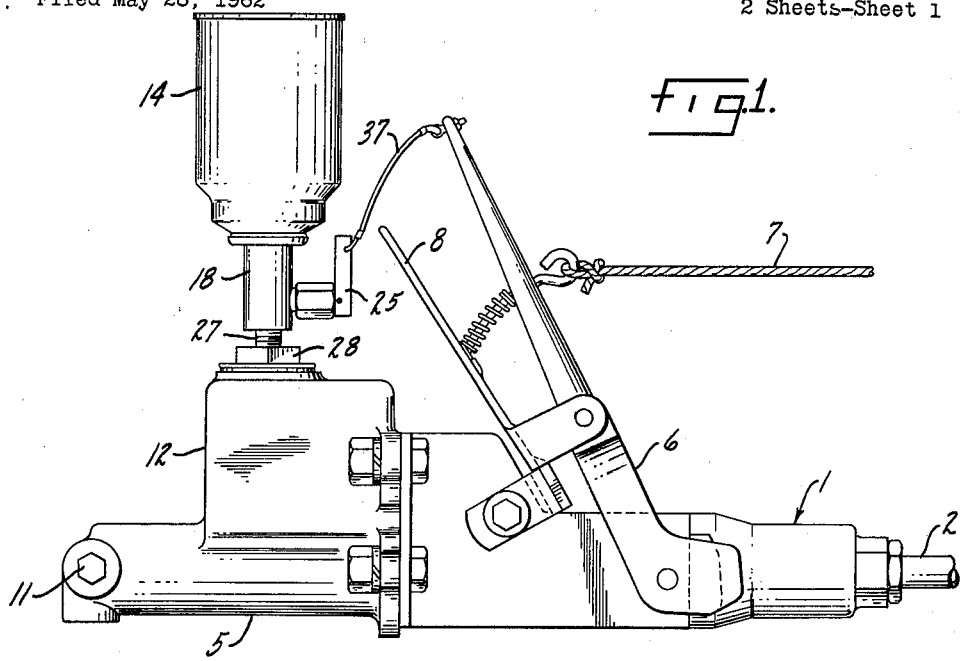
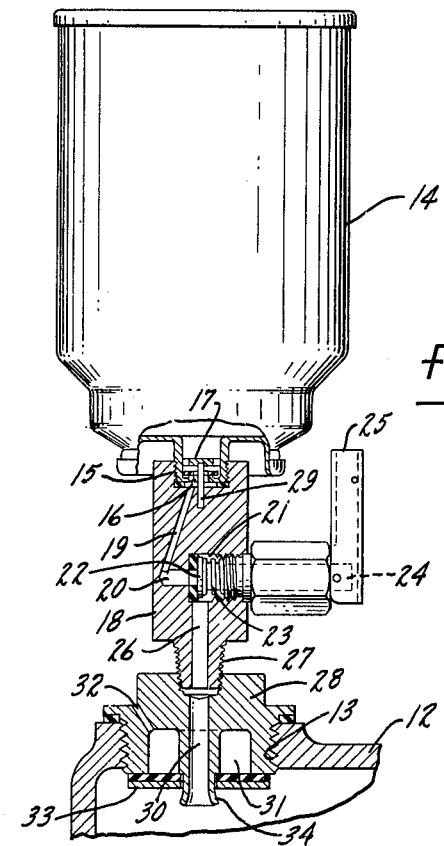
INVENTOR.
Ralph O. Stromberg,
BY Parker & Carter
Attorneys.

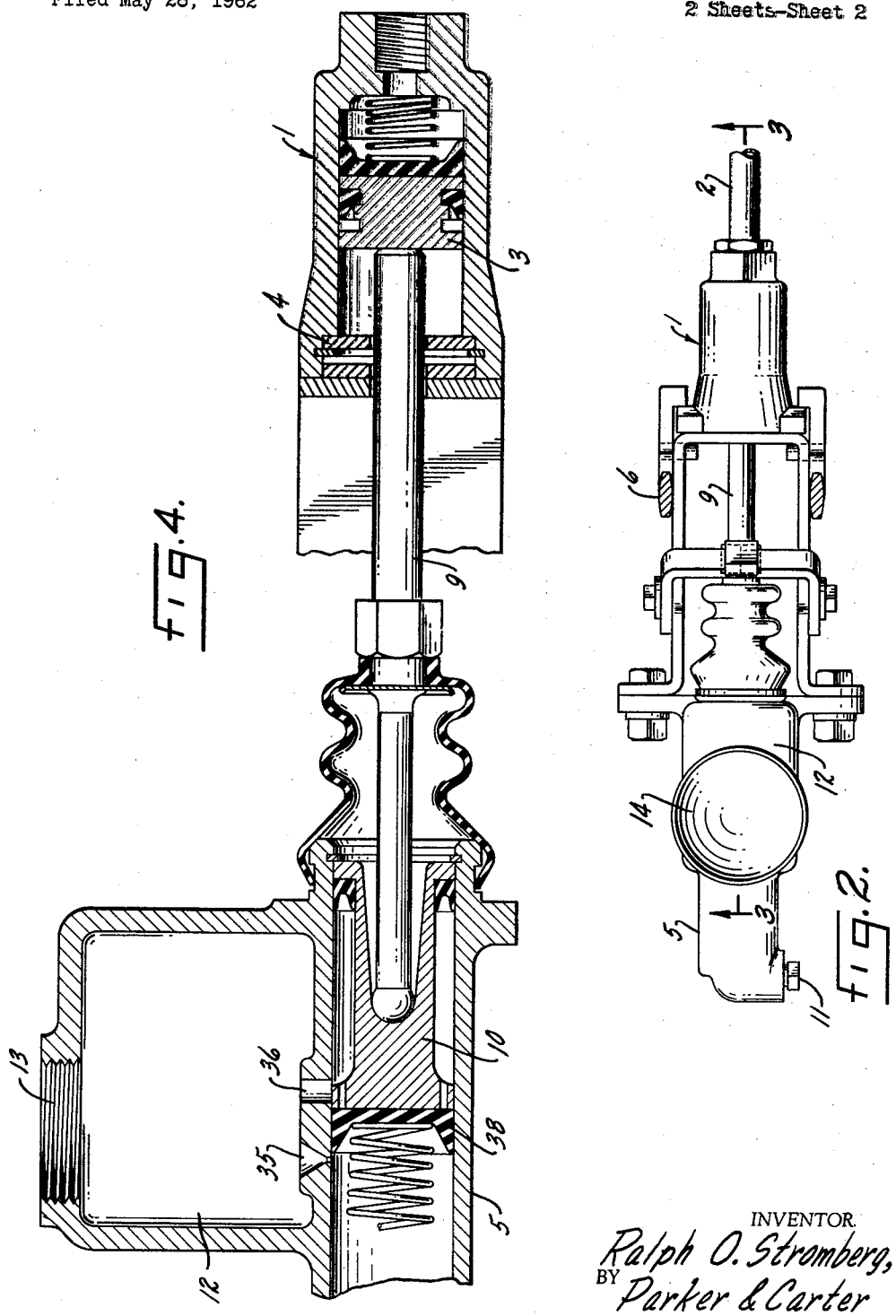

United States Patent Office 3,147,043
Patented Sept. 1, 1964

3,147,043
HYDRAULIC BRAKE ACTUATING MECHANISM
FOR AUTOMOTIVE VEHICLES
Ralph O. Stromberg, Chicago, Ill., assignor to Stromberg Hydraulic Brake & Coupling Co., Chicago, Ill., a corporation of Illinois
Filed May 28, 1962, Ser. No. 198,045
6 Claims. (Cl. 303—18)

My invention relates to improvements in hydraulic brake systems for automotive vehicles and is an improvement on my co-pending application Serial No. 145,527 filed September 29, 1961 for Hydraulic Brakes for Automotive Vehicles.

In general my application relates to means in addition to the usual foot operated means for actuating the hydraulic brakes of an automotive vehicle and while not so limited in its use, it is especially well adapted to applying the trailer brakes of a trailer tractor combination when the trailer brake system is unintentionally or by accident disconnected from the tractor brake system.

In general, I propose to provide automatic means which will apply pressure through the usual hydraulic brake system reservoir to the system independent of the conventional brake applying mechanism which normally operates independent of the reservoir.

Other objects will appear from time to time throughout the specification and claims.

The invention is illustrated more or less diagrammatically in the accompanying drawings, wherein FIGURE 1 is a side elevation of my device in working position;

FIGURE 2 is a top plan view with parts in section of FIGURE 1;

FIGURE 3 is a section on an enlarged scale through the line 3—3 of FIGURE 2 showing the top part of the apparatus;

FIGURE 4 is a vertical section on an enlarged scale through the line 3—3 of FIGURE 2 showing the bottom part;

Like parts are indicated by like characters throughout the specification and drawings.

The slave cylinder 1 is connected to the hydraulic brake system of the tractor by the duct 2. It contains a plunger 3, with the usual packing. The end of the cylinder is closed by a perforate washer 4 and the cylinder is adapted to be clamped removably on the trailer master cylinder 5 by lock lever 6 which may be released when tension is applied by the safety cord 7 rotating the latch lever 8 to release the lock lever so that the slave cylinder may escape.

A pressure stem 9 extends out from the master cylinder 5, through the washer 4 and abuts against the plunger 3 so that application of pressure on the hydraulic tractor brake system moves the plunger 3 to the left and displaces the master plunger 10 in the master cylinder to exert a pressure on the trailer hydraulic brake system through the duct 11.

Associated with the master cylinder 5 is a hydraulic fluid reservoir 12 ported as at 13 for the usual filler cap.

The usual type of pressure can 14 adapted to hold carbon dioxide or other gas under pressure has a threaded stem 15 apertured at 16, the aperture being closed by a poppet valve 17 which seats under pressure of the gas in the can. The stem 15 is threaded into a valve housing 18 which includes ducts 19, 20, leading from the open end of the housing to a spring chamber 21 which contains a control valve 22 seated by a spring 23. A plunger 24 associated with the control valve 22 may be drawn back by the lever 25 to open the valve to connect the ducts 19 and 20 with a duct 26 which is open at the lower end of the valve housing 18. The valve housing is threaded at 27 and screwed into the filler cap 28 which in turn is threaded into the port 13. A pin 29 extends upwardly from the valve housing to unseat the poppet valve 17 when the can is screwed home so that when the control valve 22 is opened, gas from the can passes through the valve housing into the duct 30 and thence into the fluid reservoir 12.

An annular chamber 31 encircles the duct 30 at the bottom of the filler cap 28 and a breather duct 32 opens the chamber 31 to atmosphere. A flutter valve 33 encircles the duct 30 which is staked at 34 so that when the control valve is opened, gas under pressure rushes into the reservoir, builds up a pressure suddenly to drive the flutter valve into the closed position so that pressure is built up by the gas in the hydraulic fluid reservoir 12 and cannot escape through the breather duct 32.

The communication between the main hydraulic fluid reservoir 12 and the master cylinder 5 takes the form of two ports 35 and 36. Thus no matter what the position of the master plunger, there is direct communication between some part of the main cylinder and the reservoir. If the main plunger is in its normal inoperative position, the ports will be one on each side of the plunger and since the plunger has the usual one way packing 38 when pressure is applied to the hydraulic fluid in the main reservoir, that pressure is transmitted through the port 35 direct to the master cylinder in front of the plunger and through the larger port 36 past the packing 38. Thus in every case build up of above atmospheric pressure in the reservoir will, no matter what the position of the master plunger, exert a pressure in the automotive hydraulic brake system whether on the tractor or on the trailer.

A cord 37 extends from the lever 6 to the lever 25 so that if the slave cylinder is disconnected either on purpose or by accident, that cord will exert a tension on the lever, unseat the control valve 22 and allow gas pressure to build up on the brake fluid reservoir without movement of the plunger 10, thus applying the brakes independent of the usual pressure applied to the plunger 10.

I claim:

1. In a hydraulic automotive brake system, a master cylinder, a master plunger therein, means for displacing the plunger to apply pressure to the hydraulic system, a main hydraulic fluid reservoir in unobstructed communication with the master cylinder at all positions of the master plunger, the reservoir being vented to atmosphere, means for simultaneously closing said vent and applying gaseous pressure to the contents of the reservoir to actuate the brake system independent of master plunger movement,
    said means including a removable, vented filler cap for the reservoir, a gas pressure capsule removably associated with the filler cap and connected therethrough to the reservoir, a normally closed valve controlling such connection, means for opening the valve, a flutter valve in the reservoir associated with such connection adapted to close the vent when gas pressure enters the reservoir.

2. In a hydraulic automotive brake system, an open-ended master cylinder, a master piston therein, an open-ended slave cylinder, a slave piston therein, the cylinders being concentric, their open ends being opposed to, and in alignment with each other, a piston rod interposed between the pistons and means for removably locking the two cylinders together, a main hydraulic fluid reservoir in unobstructed communication with the master cylinder, the reservoir being vented to atmosphere, means for simultaneously closing said vent and applying gaseous pressure to the contents of the reservoir to actuate the brake system independent of master plunger movement responsive to the release of the means for removably locking the two cylinders together.

3. In a hydraulic automotive brake system, an open-ended master cylinder, a master piston therein, an open-ended slave cylinder, a slave piston therein, the cylinders being concentric, their open ends being opposed to, and in alignment with each other, a piston rod interposed between the pistons and means for removably locking the two cylinders together, a main hydraulic fluid reservoir in unobstructed communication with the master cylinder, the reservoir being vented to atmosphere, means for simultaneously closing said vent and applying gaseous pressure to the contents of the reservoir to actuate the brake system independent of master plunger movement, said means including a removable, vented filler cap for the reservoir, a gas pressure capsule removably associated with the filler cap and connected therethrough to the reservoir, a normally closed valve controlling such connection, means for opening the valve, a flutter valve in the reservoir associated with such connection adapted to close the vent when gas pressure enters the reservoir.

4. In a hydraulic automotive brake system, an open-ended master cylinder, a master piston therein, an open-ended slave cylinder, a slave piston therein, the cylinders being concentric, their open ends being opposed to, and in alignment with each other, a piston rod interposed between the pistons and means for removably locking the two cylinders together, a main hydraulic fluid reservoir in unobstructed communication with the master cylinder, the reservoir being vented to atmosphere, means for simultaneously closing said vent and applying gaseous pressure to the contents of the reservoir to actuate the brake system independent of master plunger movement, said means including a removable, vented filler cap for the reservoir, a gas pressure capsule removably associated with the filler cap and connected therethrough to the reservoir, a normally closed valve controlling such connection, means for opening the valve, a flutter valve in the reservoir associated with such connection adapted to close the vent when gas pressure enters the reservoir, a connection between the valve opening means and the means for locking the two cylinders together whereby when the cylinders are unlocked the valve is opened.

5. In a hydraulic automotive brake system for tractor and trailer, two open ended cylinders one on the tractor, the other on the trailer, pistons therein, the open cylinder ends being opposed to and in alignment with each other, a piston rod interposed between the pistons and means for removably locking the two cylinders together, a main hydraulic fluid reservoir on the trailer in unobstructed communication with the cylinder on the trailer, the reservoir being vented to atmosphere, means for simultaneously closing said vent and applying gaseous pressure to the contents of the reservoir to actuate the brake system on the trailer independent of the plunger movement in the cylinder on the trailer.

6. In a hydraulic automotive brake system for tractor and trailer, two open ended cylinders one on the tractor, the other on the trailer, pistons therein, the open cylinder ends being opposed to and in alignment with each other, a piston rod interposed between the pistons and means for removably locking the two cylinders together, a main hydraulic fluid reservoir on the trailer in unobstructed communication with the cylinder on the trailer, the reservoir being vented to atmosphere, means automatically responsive to separation of tractor and trailer for simultaneously closing said vent and applying gaseous pressure to the contents of the reservoir to actuate the brake system on the trailer independent of the plunger movement in the cylinder on the trailer.

References Cited in the file of this patent
UNITED STATES PATENTS

| | | |
|---|---|---|
| 1,885,580 | Bradbury | Nov. 1, 1932 |
| 2,184,042 | Harrington | Dec. 19, 1939 |
| 2,325,846 | Forbes | Aug. 3, 1943 |
| 2,843,227 | Williams | July 15, 1958 |
| 3,070,960 | Ternent | Jan. 1, 1963 |